P. F. W. C. KRIPPENDORF.
CALCULATOR.
APPLICATION FILED MAR. 7, 1908. RENEWED OCT. 18, 1909.

1,166,528.

Patented Jan. 4, 1916.
4 SHEETS—SHEET 1.

Witnesses.
Thomas F. Drummond
Joseph M. Ward

Inventor.
Paul F. W. C. Krippendorf,
by Crosby Gregory
Attys.

P. F. W. C. KRIPPENDORF.
CALCULATOR.
APPLICATION FILED MAR. 7, 1908; RENEWED OCT. 18, 1909.

1,166,528.

Patented Jan. 4, 1916.
4 SHEETS—SHEET 3.

Witnesses.
Thomas J. Drummond
Joseph M. Ward.

Inventor.
Paul F. W. C. Krippendorf,
by Crosby Gregory attys.

P. F. W. C. KRIPPENDORF.
CALCULATOR.
APPLICATION FILED MAR. 7, 1908. RENEWED OCT. 18, 1909.

Patented Jan. 4, 1916.

Fig. 10.

UNITED STATES PATENT OFFICE.

PAUL F. W. C. KRIPPENDORF, OF LYNN, MASSACHUSETTS, ASSIGNOR TO KRIPPENDORF KALCULATOR COMPANY, OF PORTLAND, MAINE, A CORPORATION OF MAINE.

CALCULATOR.

1,166,528.  Specification of Letters Patent.  Patented Jan. 4, 1916.

Application filed March 7, 1908, Serial No. 419,650. Renewed October 18, 1909. Serial No. 523,298.

*To all whom it may concern:*

Be it known that I, PAUL F. W. C. KRIPPENDORF, a citizen of the United States, residing at Lynn, in the county of Essex and State of Massachusetts, have invented certain new and useful Improvements in Calculators, of which the following is a specification.

This invention relates to calculating apparatus, and is particularly intended to provide an apparatus by means of which the area of material required to cut a number of shapes of various sizes may be readily and accurately determined. In the manufacture of shoes, for example, a certain area of leather is allowed by the manufacturer from which a given number of shoe parts of given sizes must be cut, which area depends not only upon the number, character and size of the parts, but also upon the kind of leather to be used, the style of the shoe and the manufacturer's allowance for wastage governed by the cost of the shoe. It can readily be seen that it is highly important, from the manufacturer's standpoint, that the amount of leather allowed for the cutting of the shoe parts shall be as close to the amount actually required for this purpose as is practicable, and my invention provides an apparatus by means of which this amount can be ascertained with great accuracy, my apparatus being so constructed that a clerk of little skill can operate it very quickly and easily, and without danger of making mistakes.

In constructing an apparatus in accordance with my invention I employ a registering device adapted to indicate the result of the operation of the apparatus, and I combine therewith an arrangement embodying in one way or another a number of individual measurements based upon units which are proportional respectively to the different parts with respect to which the computation is to be performed, the construction being such that in the determination of a total by the registering device each individual measurement utilized in the operation has an effect proportional to the corresponding unit, or to some multiple thereof. In the apparatus hereinafter described these unit measurements are embodied respectively in a series of what may be termed indicators, since they indicate by subdivisions formed thereon the corresponding units and multiples thereof, which indicators are successively operative to control the operation of the registering device in determining the required total.

The principles involved in the construction and operation of an apparatus embodying my invention can best be made clear by the subjoined description of a preferred form of my apparatus adapted to be used in the determination of the amount of leather required for cutting shoes, said apparatus being illustrated in the accompanying drawings, in which—

Figures 5, 6, 7, 8:
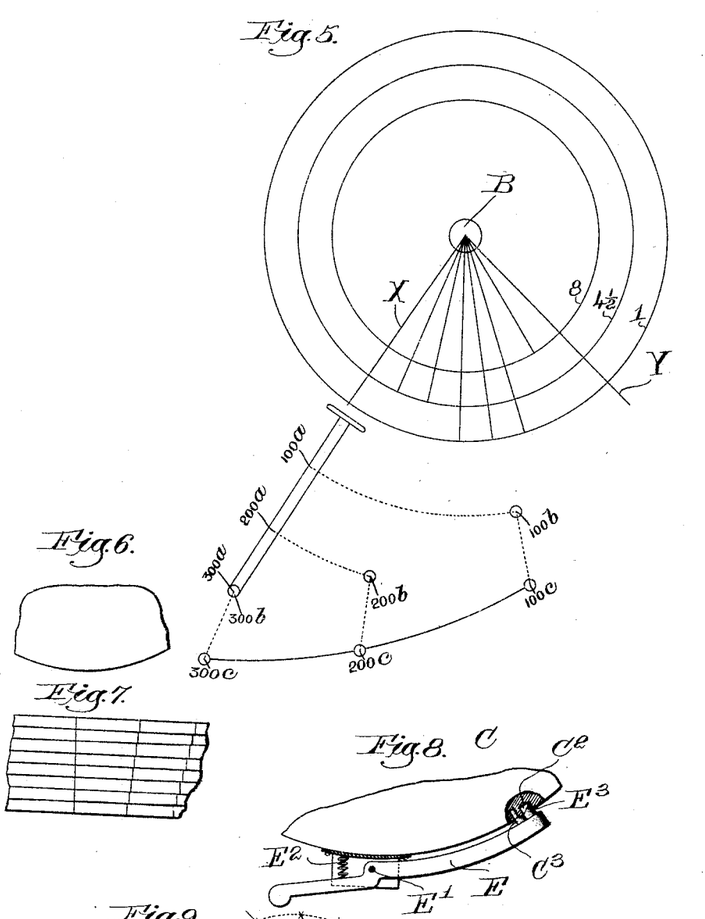
Fig. 5 is a diagrammatic view.
Fig. 6 is a top plan view of a portion of another form of indicator disks.
Fig. 7 is a front elevation of the construction shown in Fig. 6.
Fig. 8 is a detail view showing one form of the locking levers hereinafter described.

It has been found as a practical matter that for shoes of any given style and length, the actual areas of any similar shoe parts, differing only in width, are substantially proportional to the width of the shoes. For example, if in a given style the width of a shoe of B-width bears to the width of a shoe of C-width the ratio of 36:37 then the area of the vamp of the B-width shoe will bear substantially the same ratio to the area of the vamp of a C-width shoe. If, therefore, for any given style of shoe and for any given kind of shoe parts, a series of numbers be obtained, based upon the actual measurement of the parts in question and proportional to the areas of said parts for all the different lengths of shoes, the ratios between said numbers will be substantially the same for all widths of shoes. Advantage can be taken of this principle, in constructing an apparatus for the purpose of determining the amount of leather required for cutting shoe parts, by so constructing the series of indicators above referred to that they will represent in their operative effect the aforesaid ratios above discussed. In the apparatus herein described these indicators are shown as circular disks located one above another and mounted for angular movement upon a common axis which is central to all the disks, the units of angular movement of the several disks being so indicated or determined as to have the aforesaid ratios to one another. Two ways are shown whereby this series of ratios may be embodied in the disks. In the preferred form illustrated in Figs. 1 and 2, the disks have equal peripheral graduations and their diameters vary according to the given ratios, while in the construction indicated in Figs. 6 and 7 the disks are of the same diameter and their peripheral graduations vary. With either arrangement, if the zero points on the peripheral graduations of the series of disks be set in line and the disks corresponding to the lengths of the shoe parts included in the calculation be moved cumulatively, each a number of units equal to the number of shoe parts of the corresponding length, the total angle extending between the original zero line and the zero point of an indicator which has all the cumulative movements imparted to it will be the sum of all the unit angles, one for each shoe part, and will vary according to the number of these parts and also according to the lengths of the same. If, now, this total angle be measured and the measurement be multiplied by a suitable constant varying according to (1) the kind of leather to be used, (2) the allowance to be made for wastage, (3) the particular part or group of parts to be cut, and (4) the width of the parts, the result will be the total amount of leather to be allowed for cutting the parts in question. The operation of multiplying by a constant of this nature is also performed by the apparatus herein described, as will presently appear.

The preferred form of the apparatus is constructed as follows: A suitable base A, shown, as a rectangular table or board, is provided, and a vertical post B is mounted thereon. The rotary indicators are herein shown as comparatively thin disks made out of wood or other suitable material, one for each length of shoe and varying in diameter according to the fixed ratios existing between shoe parts differing only in length. In the drawings, for purposes of illustration, fifteen of these indicators C are shown, corresponding to the lengths and half lengths from sizes 1 to 8 inclusive. They are centrally bored and mounted to turn on the post B. The lowermost indicator C has fastened to and movable with it a base-plate C′, hereinafter termed the actuator, since it serves to actuate through suitable connections the registering device by which the desired total is shown. Each indicator is provided with peripheral graduations all of which are equal, and which on each indicator are numbered from zero upward as 0, 1, 2, 3, 4, etc. The plate or actuator C′ and the superimposed indicators are supported to rotate upon three rolls or wheels D, D′, D′. The wheel D will be described later. The wheels D′ are mounted in any suitable manner upon the base A, as shown, to turn freely, and their planes of movement are tangential to the circles passing through their points of contact with said plate C′. At its upper end the post B is provided with a radially-projecting fixed arm B′. A locking device E is provided by which the uppermost indicator C may be locked against rotation to this arm, and each indicator (except the bottom one) is provided with a similar locking device whereby the indicator next below it may be locked to it against rotation. These locking devices E are shown in detail in their preferred form in Fig. 8, each locking device being formed as a lever fulcrumed on a vertical pin E′ and provided with a spring $E^2$ by which the handle end is pressed outwardly and the locking end thrown inwardly. The locking end is bent downwardly to engage the indicator next below the indicator carrying the fulcrum point, and is provided with a locking pin $E^3$, beveled off as shown. Each indicator at each peripheral graduation is bored or drilled out as at $C^2$, to receive the corresponding locking pin $E^3$, and is provided, adjacent to its zero graduation, with a stop $C^3$.

Figure 1:
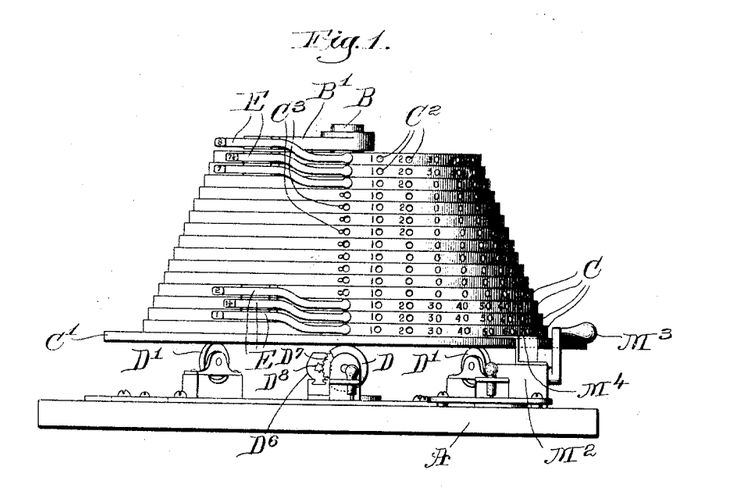
Figure 1 is a view in front elevation of the complete apparatus.
Figure 2:
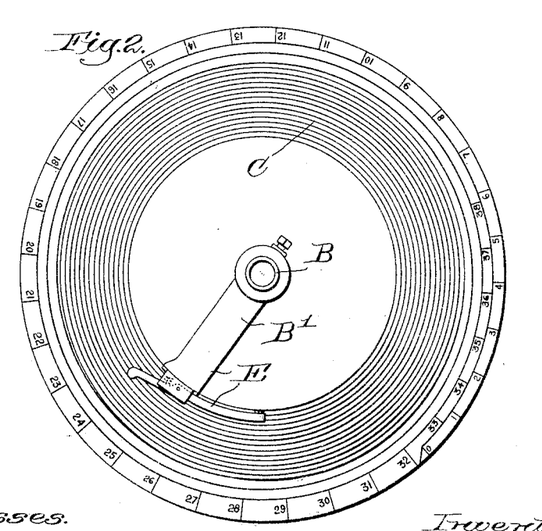
Fig. 2 is a top plan view of the indicators and connected parts hereinafter described.

It will thus be seen that when the indicators are in the position shown in Fig. 1, with the locking levers engaging the same at their zero points, if any lever be depressed and the indicator thereby unlocked be moved around to the left, all the indicators below or following it will move at the same time and to the same extent, so that the movements of the plate C′, resulting from successive movements of the indicators, are always cumulative. The cumulative movements of all indicators are therefore determined or totalized by the plate C′. It will also be seen that when the indicators, or any of them, have been displaced to the left from the position shown in Fig. 1, they may all be returned to the zero position by grasping the plate C′ and turning it in the reverse direction, whereupon the beveled edges of the locking pins $E^3$ of the levers E will slide one after the other out of the holes $C^2$ and the disks will turn until the locking pins $E^3$ come in contact with the stops $C^3$. In this way the machine may be readily cleared, preparatory to making a new computation, by merely turning the actuator reversely as far as it will go. This feature of the invention is of importance in that it tends to eliminate the danger of starting with an initial error which would be carried through the computation and render the result inaccurate.

The total angular movement of the actuator $C'$ as determined by the indicators is measured by the wheel D, which is rotated by frictional contact with said actuator, and is preferably so mounted on the shaft $D^2$ as to be slightly adjustable lengthwise thereof, being held in position thereon by the check-nuts $D^3$. The shaft $D^2$ is mounted in bearings $D^4$, projecting upwardly from a plate $D^5$. The forward end of the shaft $D^2$ operates a reading dial $D^6$. Since the measurement by the wheel D of the angular movement above referred to will evidently be affected by the distance of said wheel from the axis of the post B, it is possible by properly determining said distance to introduce into said measurement, as a factor thereof, a suitable constant which is dependent in any given instance upon one or more of such elements as the particular width of shoe, the particular part or group of parts to be cut, the kind of leather to be used, and the allowance for wastage, so that when the wheel D is set in the proper position and the apparatus is operated as previously described the dial $D^6$ will show on its face at the end of the operation the amount or area of leather required for cutting the given parts.

Figure 3:
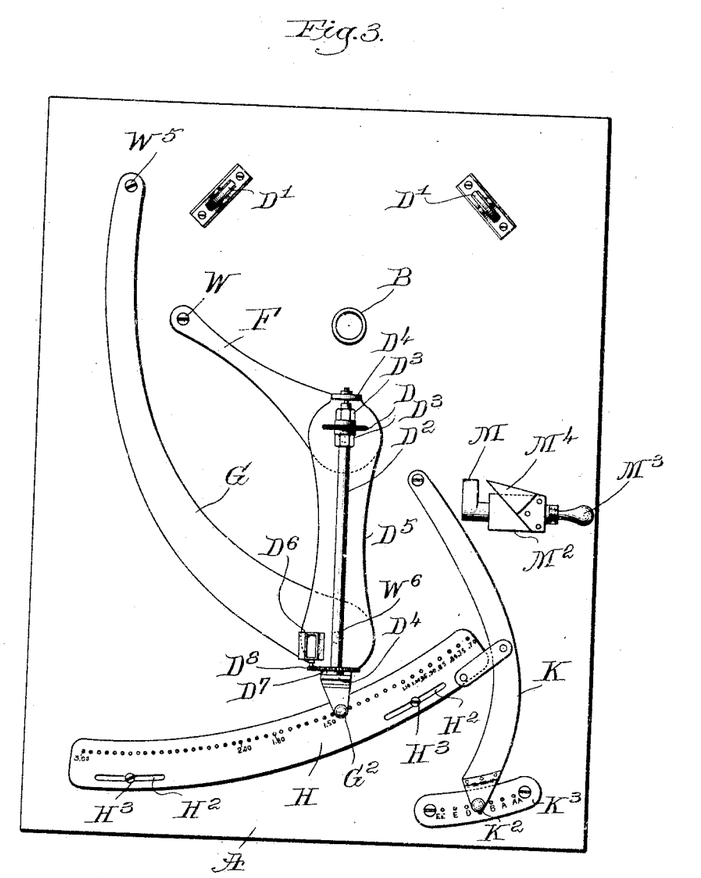
Fig. 3 is a top plan view of the parts located below the parts shown in Fig. 2.
Figure 4:
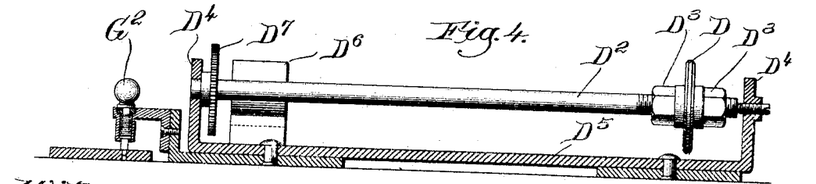
Fig. 4 is a vertical cross-section of the parts shown in Fig. 3, taken through the axis of the shaft $D^2$, omitting the base A and showing said shaft in full.
Figure 9:
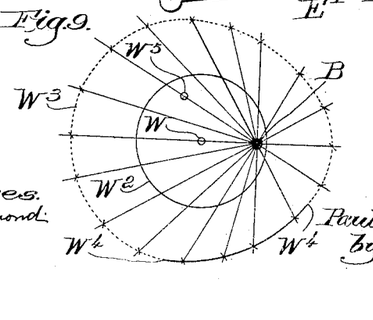
Fig. 9 is a diagrammatic view.
Figure 10:
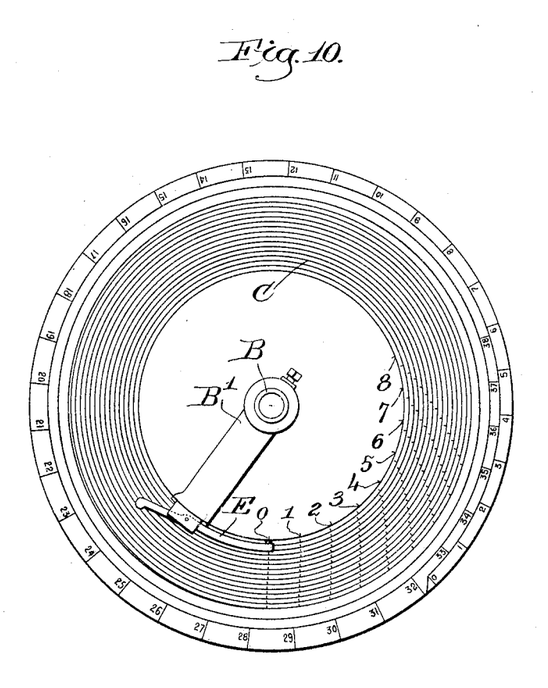
Fig. 10 is a diagrammatic view of the construction shown in Figs. 1 and 2, illustrating more fully the peripheral graduations on the indicators.

To secure the result just set forth it is only necessary to move the shaft $D^2$ with its wheel D radially with respect to the post B, but it is found that for an apparatus of practical size this movement would be so slight that if it should be indicated directly upon a scale having the desired number of graduations, these graduations would be undesirably close together. The reason for this will perhaps best appear from the illustration in Fig. 5. The three circles therein marked 1, 4½ and 8 respectively represent the peripheries of the indicator disks for the corresponding sizes. The total angle to be measured, extending from the line X to the line Y, is shown for purposes of illustration as made up of three unit angles caused by the movement of the size No. 4½ disk, two unit angles caused by the movement of the size No. 1 disk, and two unit angles caused by the movement of the size No. 8 disk. If this total angle between X and Y is to be measured by the wheel D and the shaft $D^2$ were moved lengthwise to and the wheel D at the desired distance place from the post B, the front or outer end of the shaft would move over a scale indicated by the marks $100^a$, $200^a$, $300^a$, but it is found that such a scale would be too small. If, however, the shaft $D^2$ be swung about the post B while it is moved radially thereof, a scale of any desired length may be secured, such as is indicated at $100^b$, $200^b$, $300^b$. It is desirable, therefore, to provide an arrangement for moving the plate $D^5$ with the shaft $D^2$ and wheel D supported thereon about the post B, while maintaining the shaft $D^2$ radial thereof, and a simple way of securing this result with sufficient accuracy for all practical purposes has been arrived at as follows. Referring to Fig. 9, where the center of the post B is represented, let any suitable point, as W, be taken as one end of a link F (Fig 3) attached to the rear or inner end of the plate $D^5$. The path of the pivotal connection of the link F and the plate $D^5$ may then be indicated by the circle $W^2$, and lines drawn outwardly from the circle $W^2$ and radial to the point B will indicate the positions which the shaft $D^2$ will take. If the same length (representing the length of the shaft $D^2$) be now measured off on each of these lines a curve $W^3$ will be plotted, and it will be found that a section of this curve extending between the points $W^4$—$W^4$, is very nearly circular, with its center located at $W^5$. Hence it follows that if a link representing in length the distance from the point $W^5$ to the arc $W^4$—$W^4$ be pivoted at the point $W^5$ in Fig. 3 and to the forward end of the plate $D^5$, then said plate $D^5$ when moved through an arc representing the arc $W^4$—$W^4$ will always remain substantially radial to the post B. The link G, Fig. 3, is accordingly pivoted at the point $W^5$ to the base A, and at the point $W^6$ to the plate $D^5$.

The link G carries at its forward end a spring-pressed pin $G^2$ which is adapted to move over a graduated scale H, the graduations being shown as a series of small holes into which the pin $G^2$ is adapted to drop. Since this pin moves in a slightly different path from that of the pivotal point $W^6$, the graduations of the scale are correspondingly modified, as indicated at $100^c$, $200^c$, $300^c$ in Fig. 5.

The scale plate H is slotted as at $H^2$ and adapted to move longitudinally to a certain extent on pins $H^3$, the means for effecting this movement being shown as a lever K provided with a spring-pressed pin $K^2$ adapted to enter any one of a number of holes in a small scale $K^3$, by means of which the extent of longitudinal movement of the scale H may be indicated. The purpose served by this arrangement will hereinafter appear.

A suitable device for raising the indicator disks to relieve the wheel D of their weight and allow of its being set in any desired position is provided, and is herein shown as a cam M mounted in a support M² and provided with a suitable operating handle M³.

The upper surface of the plate C′, on the portion projecting beyond the periphery of the lowermost indicator disk, is preferably provided with graduations starting from a zero point and running around the plate spirally. These graduations are spaced to indicate an angular movement equal to the unit angular movement of the indicator for the length 4½, and the zero point is so arranged as to be opposite a pointer M⁴, arranged at any suitable point, as on a support M², when the indicator disks are set at zero.

In using the apparatus above described it is convenient first to make out a table showing the amount of leather which it is desired to allow for the cutting of the parts of one pair of shoes of a given size which is taken as a standard such, for example, as the standard size 4½ C, which amount will include the allowance for wastage and will be separately indicated for each different part or group of parts to be cut, and also for the different styles of shoe and the kinds of leather to be used. Such a table is based on the actual area of the shoe parts as determined by careful measurement and upon the manufacturer's experience and practice with reference to the allowance for wastage, and may be in the following form:—

|  | Kid. | | Calf. | | Patent leather. |
| --- | --- | --- | --- | --- | --- |
|  | Tops. | Vamp, tip, fox. | Entire shoe. | Vamp, tip, fox. | Entire shoe. | Vamp, tip, fox. |
| Cir. fox polish | 1.40 | 1.15 | 2.50 | 1.15 | 2.40 | 1.00 |
| Cir. fox button | 1.50 | 1.15 | 2.65 | 1.15 | 2.55 | 1.00 |
| Cir. fox blucher | 1.40 | 1.15 | 2.50 | 1.15 | 2.40 | 1.00 |
| ¾ fox polish | 1.25 | 1.20 | 2.50 | 1.15 | 2.40 | 1.00 |
| ¾ fox blucher | 1.35 | 1.20 | 2.50 | 1.15 | 2.40 | 1.00 |
| low blucher | 1.15 | 1.20 | 2.35 | 1.15 | 2.25 | 1.00 |
| Str. fox blucher | 1.25 | 1.25 | 2.50 | 1.20 | 2.40 | 1.10 |
| Str. fox low blucher | 1.10 | 1.25 | 2.35 | 1.20 | 2.20 | 1.10 |
| Whole quarter polish | 1.80 | .70 | 2.55 |  | 2.45 | .65 |
| Whole quarter button | 1.90 | .70 | 2.70 |  | 2.60 | .65 |

In the foregoing table the area of the shoe parts is given in square feet and decimals thereof.

It will be observed that the above table contains no figures applying to any width of shoe other than the width C, since the variations due to different widths would complicate the table if included therein and may be conveniently provided for by an adjustment of the apparatus such as may be secured by means of the scale K³ and associated parts. To this end the scale H is so arranged and the parts are so proportioned that when said scale is adjusted by setting the pin K² in the hole corresponding to the width C on the scale K³ and the shaft D⁵ is set with the pin G² in any given hole on the scale H the wheel D, in traveling over the unit angle measured by a rotary movement of the indicator disk for the length 4½ through one peripheral graduation, will cause the dial D⁶ to read the same as the graduation at which the pin G² is set on the scale H, the graduations on said scale H being respectively numbered to represent the amount (in feet) of leather to be allowed for cutting one pair of shoes or shoe parts of the standard size 4½ C, according to style of the shoe, the nature of the parts and the kind of leather to be used, as set forth in the foregoing table. The holes in the scale K³ are respectively lettered to indicate the several widths of shoes from AA to EE, and are so located that the corresponding adjustments of the scale H will vary the measuring effect of the wheel D proportionately to the respective widths, as compared with the standard width C, the ratios embodied in the scale H being practically the same for all widths, as previously stated.

As thus constructed, the operation of the apparatus can best be made clear from a concrete example, as follows:—Let it be assumed that it is desired to cut the vamp, tip and fox of calf leather for twelve pairs of straight foxing, blucher shoes, and that the shoes are to be of width B, one pair of the size 2½, one pair of the size 3, one pair of the size 3½, two pairs of the size 4, two pairs of the size 4½, two pairs of the size 5, 1 pair of the size 5½, 1 pair of the size 6, and one pair of the size 7. The operator on glancing at the table of allowances will find the number 1.20 to be the allowance for the vamp, tip and fox of a pair of straight fox. blucher shoes of calf leather, of the size 4½C. He thereupon raises the cam M so as to remove the weight of the indicator disks C from the wheel D, and then sets the pin K² at the graduation B, indicating the required width on the scale K³. The latter operation moves the wheel D slightly nearer the post E, which takes care of the decrease in the quantity of leather required for the width B as compared with that required for the standard width C. He next sets the pin G² at the graduation 1.20 on the scale H. He then sees that the indicators C are all set at zero, which is secured by simply rotating the plate C′, as already set forth, until the pins E³ make contact with the stops C³. He then turns the shaft D², if necessary, until the dial D⁶ is set at zero. He then depresses the cam M so that the weight of the indicator disks is supported by the wheels D, D′ D″. He then depresses the appropriate levers E in order, beginning preferably with the lowermost, and causes the indicator disks to move respectively over a number of graduations equal to the number of pairs of the corresponding sizes. In the concrete example given he first depresses the lever E marked 2½, and grasping the base plate C′ moves it to the left, as viewed in Fig. 1, until the pin E³ on said lever drops into the peripheral graduation marked 1. He then depresses the lever E marked 3 and does the same thing, but it will be noted that in moving the plate C' this time the disk previously moved travels along with the indicator disk for the size 3. Continuing the operation, he moves the disk for the size 3½ one graduation, the disks for the sizes 4, 4½ and 5 two graduations each, and the disks for the sizes 5½, 6 and 7 one graduation each. Upon completing the operation the dial D⁶ will show the total number of feet required to cut the parts in question. Meanwhile, the pointer M⁴, indicating the spiral graduations on the edge of the plate C', serves as a check upon the operator and prevents mistake being made by omitting in the operation to include one or more pairs in the calculation, because this pointer will indicate quite closely the total number of pairs on the graduations on the plate C', and in the concrete example stated the pointer M⁴ will be found to be in the vicinity of the graduation marked 12.

While the apparatus has been particularly described with reference to the measurements of shoe parts, it will be understood that my invention may be embodied in apparatus adapted for use in measuring a variety of other articles of regular or irregular shapes, and that it is not limited to the employment of circular rotary indicators or of the various other mechanical details herein specifically described.

I claim as my invention:

1. A calculating apparatus comprising a registering device adapted to indicate a calculated total area, in combination with actuating means therefor, and a plurality of indicators each movable by one, or progressively by more than one, unit of movement for operating the actuating means, the units of movement of the several indicators being different and respectively proportional to the different parts subjected to calculation.

2. A calculating apparatus comprising a registering device adapted to indicate a calculated total, in combination with an actuating means therefor, a plurality of indicators each movable by units of movement for operating said actuating means, the units of movement of the several indicators being respectively proportional to the different parts subjected to calculation, and adjustable connections between said actuating means and the registering device to vary the effect of the former upon the registering device.

3. A calculating apparatus comprising separate measurement indicating devices each bearing a predetermined relation to the corresponding part subjected to calculation and being progressively movable in accordance with the number of said parts, means for totalizing the movements of all the indicating devices, means for multiplying the result by a constant, and a registering device for indicating the final product.

4. A calculating apparatus comprising, in combination, means movable to express mechanically the total of a number of measurements based upon units which are proportional respectively to the different parts subjected to calculation, means for multiplying said total by a constant, means for varying said constant, and a registering device adapted to indicate the final result.

5. A calculating apparatus comprising a registering device, an actuator for said device, and a series of indicators each corresponding to a part to be subjected to calculation and each being movable progressively through a plurality of unit movements dependent in number upon the number of said corresponding parts for determining mechanically the extent of movements of the actuator.

6. A calculating apparatus comprising a registering device, an actuator for said device, a series of indicators each corresponding to a part to be subjected to calculation and each being movable progressively through a plurality of unit movements dependent in number upon the number of said corresponding parts for determining mechanically the extent of movements of the actuator, and adjustable connections between the actuator and the registering device whereby the effect of the actuator on the registering device may be varied.

7. A calculating apparatus comprising a registering device adapted to indicate the sum of a series of movements successively imparted to it, and a series of graded indicators all operatively connected to the registering device and each being movable progressively through one or more steps of predetermined extent, said steps being permanently measured upon each indicator and bearing a predetermined proportion to each other.

8. A calculating apparatus comprising a series of movable indicators, and means for determining the cumulative result of the operations of one or more of said indicators, said indicators being uniformly graduated and of uniformly varying sizes and being constructed and arranged to impart to said means by their operation results differing by predetermined proportions.

9. A calculating apparatus including a series of indicators each movable in multiples of predetermined and different units of movement and provided with a stop mechanism to limit is movement in accordance with said unit or multiples thereof.

10. A calculating apparatus comprising, in combination, a series of angularly-movable indicators mounted on a common axis, each indicator being provided with graduations representing multiples of one of a series of units bearing a predetermined proportion to one another, locking devices to hold said indicators in their initial positions, and means for registering the sum of a series of movements cumulatively imparted to said indicators.

11. A calculating apparatus comprising, in combination, a registering device, an actuator therefor, a plurality of members embodying predetermined permanently indicated measurements, each controllably related to said actuator for determining the movements of said actuator, adjustable connections between the actuator and registering device, and a scale indicating the adjustment of said connections.

12. A calculating apparatus comprising, in combination, a registering device, an actuator therefor, means embodying predetermined permanently indicated measurements for determining the movements of said actuator, adjustable connections between the actuator and registering device, a scale indicating the adjustment of said connections, and means for adjusting said scale.

13. A calculating apparatus comprising, in combination, a rotary plate, a series of indicators adapted to govern successive movements thereof in one direction, a disk having peripheral contact with said plate and mounted to rotate on an axis extending radially with respect to the axis of said plate, and a registering device operated by said disk.

14. A calculating apparatus comprising, in combination, a rotary plate, a series of indicators adapted to govern successive movements thereof in one direction, a disk having peripheral contact with said plate and mounted to rotate on an axis extending radially with respect to the axis of said plate, means for adjusting said disk toward and away from the latter axis, and a registering device operated by said disk.

15. A calculating apparatus comprising, in combination, a rotary plate, a series of indicators adapted to govern successive movements thereof in one direction, a disk having peripheral contact with said plate and mounted to rotate on an axis extending radially with respect to the axis of said plate, means for adjusting said disk toward and away from the latter axis, a graduated scale to indicate different positions of the disk, and a registering device operated by said disk.

16. A calculating apparatus comprising, in combination, a rotary plate, a series of indicators adapted to govern successive movements thereof in one direction, a disk having peripheral contact with said plate and mounted to rotate on an axis extending radially with respect to the axis of said plate, means for adjusting said disk toward and away from the latter axis, a graduated scale to indicate different positions of the disk, means for adjusting said scale, and a registering device operated by said disk.

17. A calculating apparatus comprising, in combination, a rotary plate, a series of indicators adapted to govern successive movements thereof in one direction, a disk having peripheral contact with said plate and mounted to rotate on an axis extending radially with respect to the axis of said plate, a registering device operated by said disk, means for adjusting the disk toward and away from the axis of the plate, a graduated scale to indicate different positions of the disk, means for adjusting said scale, and a supplementary scale on which the adjustments of the first-mentioned scale are indicated.

18. A calculating apparatus comprising a series of rotary indicators mounted upon a common axis, means for detachably locking the indicator at one end of the series in fixed position, and means for detachably locking each succeeding indicator to the next preceding indicator, in combination with a registering device and operating connections between the same and the series of indicators.

19. A calculating apparatus comprising, in combination, a rotary plate, a series of indicators for determining the movements thereof in one direction, a disk normally having peripheral contact with said plate and mounted to rotate on an axis extending radially with respect to the axis of the plate, a registering device operated by said disk, and means for relieving the disk of the weight of the plate.

20. A calculating apparatus comprising, in combination, a rotary plate, a series of indicators for determining the movements thereof in one direction, three disks mounted to rotate on axes extending radially with respect to the axis of the plate and arranged to support the latter on their peripheries, a registering device operated by one of said disks, and means for relieving the latter disk of the weight of the plate.

21. A calculating apparatus comprising, in combination, a series of independently-movable indicators each provided with unit graduations, a registering device, operating connections between the latter and the indicators, whereby the registering device is operated by the movement of each indicator and means for checking the total number of unit movements imparted to all of said indicators.

22. A calculating apparatus comprising, in combination, a series of independently movable indicators graduated in multiples of units proportional to the areas of shoe parts differing only in length, a registering device, and means controllably related at all times to each of said indicators for operating the registering device when any one of the indicators is moved.

23. A calculating apparatus comprising a series of movable length indicators, a single width indicating device arranged in co-active relationship with said length indicators, a constant indicating device, and registering means connected both to the width and to the constant indicating devices and arranged to be operated by the movement of one or more of the length indicators.

24. A calculating apparatus having, in combination, a plurality of separate movable unit members, together with an actuator controllably related to all of the members but selectively controlled by the one moved farthest from its zero position.

25. A calculating apparatus comprising a series of devices movable angularly about a common center and each provided with graduations for indicating angular movement, the unit angles of movement of the several devices being proportional to the areas of the shoe parts of shoes differing only in length, and radially adjustable means for automatically measuring the total angle resulting from the successive and cumulative rotation of the said devices a number of unit angles represented by the corresponding respective numbers of shoe parts.

26. A calculating apparatus comprising a series of circular, concentrically mounted indicators having peripheral unit graduations which subtend angles proportional in the respective indicators to the area of shoe parts of shoes differing only in length, means for normally holding the zero points of said indicators in alinement and for imparting to the indicator first rotated the rotations of all the indicators subsequently rotated, and means for measuring the total angular displacement of the indicator moved farthest from zero position.

27. In a calculating apparatus, the combination of a series of circular, concentrically-mounted indicators having peripheral unit graduations on each, the proportions between the unit angles subtended at the center of the respective indicators by said graduations being those of the areas of the shoe parts of shoes differing only in length, means for normally holding the zero points of said indicators on a given radial plane and for imparting to the indicator first rotated the rotations of all the indicators subsequently rotated, whereby the said given radial plane and the radial plane passing through the zero point moved farthest will form an angle representing the summation of the unit angles through which the respective indicators have been rotated, and means for measuring the said total angle at a distance from the axis of the indicators, said measuring means being radially adjustable.

28. In a calculating apparatus, the combination of a series of superposed rotary indicators, one for each length of shoe, having a common center and graduated into units, the units of the respective indicators having the proportions of the areas of similar shoe parts of shoes of different lengths, means for detachably locking the topmost indicator in fixed position, and means for detachably locking each succeeding indicator to the one above it, whereby said indicators may be rotated respectively in accordance with the number of shoe parts of corresponding size.

29. In a calculating apparatus, the combination of a series of rotary indicators, one for each length of shoe, having a common center and varying in diameter, the radii of the said indicators being proportional to the areas of similar shoe parts of shoes of varying lengths, and the peripheries of said indicators being graduated into equal divisions, means for normally holding the zero point of said indicators on a given radial plane, means whereby when any given indicator is rotated the indicators following it will rotate with it, a shaft, a friction disk carried by said shaft and arranged to be rotated by the rotation of said indicators, registering mechanism operated by said shaft, and means for varying the distance of the friction disk from the axis of the rotary indicators.

30. In a calculating apparatus, the combination of a shaft, a friction disk on said shaft, registering mechanism operated by said shaft, and means for maintaining said shaft radial with respect to a fixed center as the shaft is moved angularly and toward or from said center to vary the distance of said disk therefrom.

31. In a calculating apparatus, the combination of a shaft, a friction disk on said shaft, registering mechanism operated by said shaft, means for maintaining said shaft radial with respect to a fixed center as it is moved to vary the distance of said disk from said center, and a scale extending transversely to said shaft and indicating radial distances from said center.

32. In a calculating apparatus, the combination of a shaft, a friction disk on said shaft, registering mechanism operated by said shaft, a scale extending transversely to said shaft and indicating radial distances from a fixed center, means for maintaining said shaft radial with respect to said center as it is moved radially and angularly with respect to the same, and means for transmitting measured movements to said disk.

33. In a calculating apparatus, the combination of a shaft, a friction disk on said shaft, registering mechanism operated by said shaft, a scale extending transversely to said shaft and indicating radial distances from a fixed center, means for maintaining said shaft radial with respect to said center as it is moved radially and angularly with respect to the same, and means for shifting the position of said scale.

34. In a calculating apparatus, the combination of a series of rotary indicators, one for each length of shoe, said indicators being concentrically mounted and provided with peripheral unit graduations on each, and the proportions between the unit angles of the respective indicators being those of the areas of the shoe parts of shoes differing only in length, a plate concentrically arranged with respect to and mounted beneath and supporting said indicators and extending at its edge beyond the periphery of the lowermost indicator, a shaft, a friction disk on said shaft adapted to contact with and be rotated by said plate, registering mechanism operated by said shaft, and means for varying the distance of said disk from the axis of the indicators.

35. In a calculating apparatus, the combination of a series of movable indicators, each provided with graduations, the proportions between said graduations being those of the areas of the shoe parts of shoes differing only in length, means for normally holding the zero points of said indicators in line so constructed and arranged that when any given indicator is moved the indicators following it will be caused to be moved with it, and the distance between the original zero line and the zero line of the indicator moved farthest will be the summation of the units of the respective indicators corresponding respectively to the number of shoe parts, which then may be multiplied by a constant to obtain the required area.

36. In a calculating apparatus, the combination of a series of movable indicators, each provided with graduations, the proportions between said graduations being those of the areas of the shoe parts of shoes differing only in length, means for normally holding the zero points of said indicators in line, means whereby when any given indicator is moved the indicators following it will be caused to be moved with it, and the distance between the original zero line and the zero line of the indicator moved farthest will be the summation of the units of the respective indicators corresponding respectively to the number of shoe parts, and means for automatically measuring and multiplying by a constant the said distance to obtain the total required area.

37. A calculating apparatus comprising a series of scales indicating permanently different units which are proportional respectively to the areas of different shoe parts, means for totalizing a number of such units corresponding to the number of parts subjected to calculation, means for multiplying the total by a constant, and a plurality of means for varying said constant.

38. A calculating apparatus comprising a series of scales indicating permanently different units which are proportional respectively to the areas of different shoe parts, and a rotatable device constructed and arranged to be moved from initial position a distance dependent upon the number of shoe parts subjected to calculation and also upon the corresponding units of said scales.

39. In a calculating apparatus, register operating means comprising a plurality of independently movable unit members, and a movable actuator controllably related to all of the unit members but selectively controlled in its movement by the member moved farthest from initial position.

40. A calculating apparatus having, in combination, a plurality of indicators, and a single actuator controllably related to all of said indicators and movable simultaneously with one or more of said indicators, said indicators being so connected to the actuator that a reverse movement of the actuator returns all the indicators to their initial positions.

41. A calculating apparatus having, in combination, a plurality of indicators, and an actuator movable simultaneously with one or more of the indicators, said indicators having normally a positive one-way connection with the actuator arranged to permit yieldingly relative movement in the other direction.

42. A calculating apparatus having, in combination, a plurality of circular indicators having diameters inversely proportional to shoe sizes and uniform peripheral graduations, and a registering device arranged to be advanced by each movement of an indicator.

43. A calculating machine having, in combination, an actuator arranged to be moved cumulatively, a registering device associated therewith and movable radially relatively to a fixed center in order that the indicated results may be varied, and a curved scale having a center at one side of said fixed center for showing the radial position of the registering device.

44. A calculating machine having, in combination, an actuator, and a series of indicator disks disposed above the actuator and having progressively decreasing diameters and uniform peripheral graduations, said disks being so connected to the actuator as to determine angular movements thereof of varying amounts by equal peripheral movements.

45. A calculating apparatus comprising, in combination, means movable to express mechanically the total of a number of measurements based upon units which are proportional respectively to the different parts subjected to calculation, means for multiplying said total by a constant, said means being adjustable to vary the constant, and a registering device constructed and arranged to indicate the final result.

In testimony whereof, I have signed my name to this specification, in the presence of two subscribing witnesses.

PAUL F. W. C. KRIPPENDORF.

Witnesses:
THOMAS J. DRUMMOND,
MABEL PARTELOW.

---

It is hereby certified that in Letters Patent No. 1,166,528, granted January 4, 1916, upon the application of Paul F. W. C. Krippendorf, of Lynn, Massachusetts, for an improvement in "Calculators," an error appears in the printed specification requiring correction as follows: Page 5, line 126, claim 9, for the word "is" read *its;* and that the said Letters Patent should be read with this correction therein that the same may conform to the record of the case in the Patent Office.

Signed and sealed this 25th day of July, A. D., 1916.

[SEAL.]

F. W. H. CLAY,

*Acting Commissioner of Patents.*

Cl. 235—61.